United States Patent
Schwartz (10) Patent No.: US 8,929,182 B1
(45) Date of Patent: Jan. 6, 2015

(54) OPTICAL MEDIA ENCODING WITH HYBRID OPTICAL DISCS

(71) Applicant: Amazon Technologies, Inc., Reno, NV (US)

(72) Inventor: Benjamin Martin Schwartz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/034,302

(22) Filed: Sep. 23, 2013

(51) Int. Cl.
*G11B 7/085* (2006.01)
*G11B 20/00* (2006.01)
*G11B 7/24094* (2013.01)
*G11B 7/2534* (2013.01)

(52) U.S. Cl.
CPC ........ *G11B 20/0063* (2013.01); *G11B 7/24094* (2013.01); *G11B 7/2534* (2013.01)
USPC ..................................... 369/30.03; 369/275.4

(58) Field of Classification Search
USPC .......... 369/275.1, 275.2, 275.4, 44.11, 30.03, 369/47.12; 428/64.7
See application file for complete search history.

(56) References Cited

U.S. PATENT DOCUMENTS

| | | | |
|---|---|---|---|
| 7,103,781 B2 | 9/2006 | Gotoh et al. | |
| 7,616,552 B2 * | 11/2009 | Abe et al. | 369/275.4 |
| 8,254,233 B2 * | 8/2012 | Yamaoka et al. | 369/53.21 |
| 2009/0196582 A1 | 8/2009 | Wei | |

FOREIGN PATENT DOCUMENTS

EP          1720165 B1    10/2010

* cited by examiner

*Primary Examiner* — Ali Neyzari
(74) *Attorney, Agent, or Firm* — Knobbe Martens Olson & Bear, LLP (57) ABSTRACT

A disc encoding system encodes a plurality of optical discs with identical data on a first portion and variable data on a second portion of each of the plurality of optical discs. A hybrid disc can include a first and a second portion. The hybrid disc enables encoding the identical data on the first portion using a disc pressing process in which a master disc is used to define a pressing pattern. The variable data can be written on the second portion using a disc burning process in which at least one laser is used to modify a reflective property of the hybrid optical disc material, such that at least some of the optical discs vary in content. In an embodiment, the identical data includes one of movies, games, software, or music and the variable data includes one of digital fingerprints, logo data, or advertisement content. The disc encoding system can use location identifiers to identify location in the second portion of the hybrid optical disc for burning varying data.

24 Claims, 5 Drawing Sheets

OPTICAL MEDIA ENCODING WITH HYBRID OPTICAL DISCS

BACKGROUND

Optical discs represent a popular medium for distributing content, such as movies, software, games, music, technical documents, and the like. Optical discs can come in many formats, for example, CDs, DVDs, and high definition optical discs, such as Blu-ray™ discs. Most of the optical discs sold to consumers are mass-manufactured in a molding or "pressing" operation. A master disc including a pattern of the data to be included on the disc is pressed against a blank optical disc in a physical stamping operation. The blank optical disc includes a material that can retain the pattern from the master. Another method of fabricating an optical disc includes burning data on to the disc. A high power laser can selectively heat parts of a material on the optical disc to change the physical properties of the material in the selected locations. The change in physical property (e.g., reflectivity) can be used to encode data in the optical disc. Most of the optical discs sold are created either through a molding or burning process.

Piracy of optical discs is one of the major concerns for content distributors. Counterfeit copies can be created from the original discs. The counterfeit copies include the same original content as the original disc and can be played in the same readers (e.g., CD player, DVD player, etc.) as the original copies.

DETAILED DESCRIPTION

Various embodiments will be described hereinafter with reference to the accompanying drawings. These embodiments are illustrated and described by example only, and are not intended to be limiting.

I. Problems Fingerprinting an Optical Disc

Optical discs are typically manufactured using one of the two processes described above: pressing or burning. Each of these processes has certain advantages and disadvantages. For example, the mastering process can be fast and scalable. A pressing apparatus can encode data on an optical disc in one physical stamping/pressing operation. Accordingly, the pressing process is efficient for mass manufacturing optical discs containing identical data. The mastering process, however, requires fabricating a master disc that includes data patterns to write on the optical discs. Fabricating the master can be a time consuming and expensive process. In contrast, the burning process of writing data on an optical disc offers more flexibility. Data can be written on the optical disc using one or more lasers without any of the overhead of fabricating a master. Furthermore, with the burning process, data can be written in any location of the optical disc by aligning the laser over a particular position on the disc. The burning process, however, is too slow for mass-manufacturing optical discs that include substantially the same data (e.g., movie DVDs, high definition optical discs or audio discs).

Thus, the mastering process is more efficient for mass-manufacturing optical discs, where each of the optical discs includes the same fixed content. In some instances, however, there might be a need to include a small portion of varying data in addition to the majority of fixed data. For example, manufacturers may want to include varying digital fingerprint or digital watermark data in each optical disc to curb piracy. In addition, there may be a need to include varying data for different geographic locations. For example, data corresponding to different copyright notices may be included in the disc depending on its geographic sale region. The disc pressing process, as currently practiced with existing disc formats, is not well suited for these scenarios, as it is often cost prohibitive to create a separate master for each variation or version.

II. Proposed Solution Overview

Existing optical disc fabrication methods typically fail to provide an efficient solution for mass-manufacturing optical discs containing substantially fixed primary data along with the varying data for each disc. It would be beneficial to provide a fabrication system and optical disc format that provide both the speed of the disc pressing process and the flexibility of the disc burning process. Certain embodiments of the systems described herein can provide some or all such benefits, overcome shortfalls of existing fabrication systems, and can be applicable to fabricating a variety of types of optical discs (e.g., CDs, DVDs, high definition optical discs, etc.) for variety of data (e.g., software, music, movies, games, manuals, etc.).

Embodiments of systems and methods described herein are designed to leverage the advantages of both the burning and the pressing fabrication methods. For example, in one embodiment, the systems and methods described herein use the mastering process to encode fixed data (e.g., fixed movie content) on an optical disc and the burning process to encode variable data (e.g., a digital fingerprint or identifier) on the same optical disc.

One aspect of the disclosure is a new optical disc format, referred to herein as a hybrid optical disc format, that supports both pressing and burning. In one embodiment, a hybrid optical disc includes a first portion that is configured to be encoded via a disc pressing process, and a second portion (which is typically significantly smaller) that is configured to be written to by a disc burning process. The hybrid optical discs enable identical content to be rapidly encoded onto a large number of discs via pressing, while allowing these discs to be varied in content via disc burning. The hybrid optical discs are preferably compatible (readable) with existing optical disc readers or players, such as commercially available DVD players. The hybrid optical discs are especially useful for disc fingerprinting (as described below), but can also be used for a wide range of other applications; for example, they can be used to vary the logos, advertisements, movie trailers, copyright notices, etc. included on a disc with a movie.

III. Example Optical Disc Fingerprinting System Overview

Figure 1:
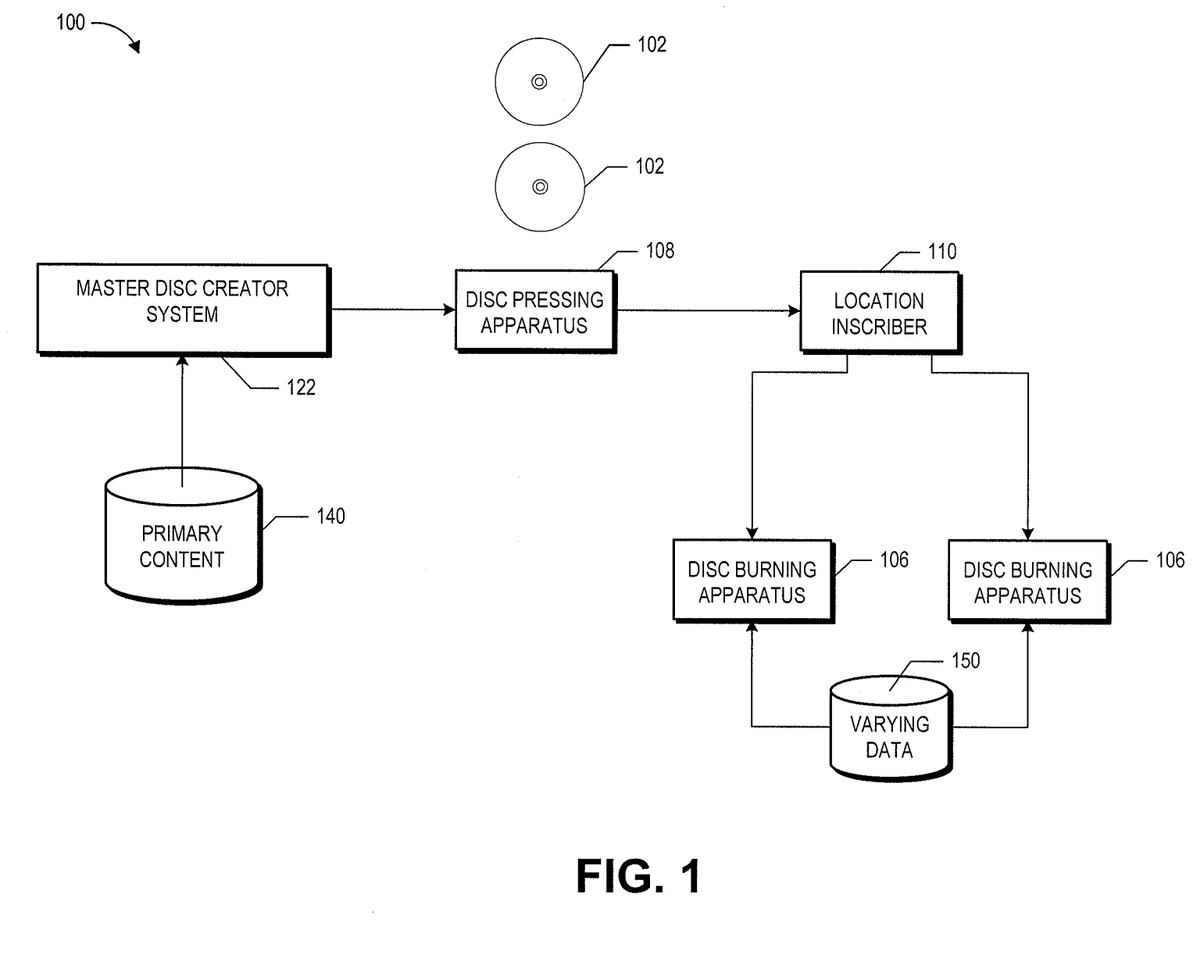
FIG. 1 is a block diagram illustrating optical disc fingerprinting systems in accordance with embodiments of the disclosure.

FIG. 1 illustrates an embodiment of a fingerprinting system 100 for fabricating an optical disc including a fixed data portion and a digital fingerprint. The fingerprinting system 100 can include a disc pressing (molding) apparatus 108, and one or more burning apparatuses 106 for fabricating optical discs 102.

The fingerprinting system 100 can further include a master disc creator system 122. The master disc creator system 122 can produce a master for use in the pressing process as described below. The master disc creator system 122 can select data from a primary content data source 140 to fabricate a master. The fabricated master disc can include patterns associated with the selected data. The selected data can correspond to a movie, software, a game, audio, manuals etc. In an embodiment, the master disc is formed from a glass substrate. The master disc creator system 122 can be entirely automated or may require or permit user intervention. Techniques for creating a master disc are well-known. For example, the master disc creator system 122 can use glass mastering, photoresist mastering, or dye-polymer mastering techniques to fabricate a master. In some instances, an electroforming process can further protect the glass master from damage during the molding process in the pressing apparatus 108. The master disc can also be specially configured for encoding data on hybrid optical discs. As described above, hybrid optical discs include a first portion that is configured to be encoded via a disc pressing process, and a second portion (which is typically significantly smaller) that is configured to be written to by a disc burning process. The master disc can be specially configured to match the first portion of hybrid optical discs. For example, the master disc may have a radius smaller than the radius of hybrid optical discs to avoid pressing on the second portion of hybrid optical discs.

The pressing apparatus 108 can use the fabricated master disc including patterns corresponding to the selected primary data to manufacture hybrid optical discs 102 with the selected primary data. The pressing apparatus 108 can transfer the pattern included in the master disc on to the hybrid optical disc by a physical stamping like operation. In an embodiment, the pressing apparatus 108 can be a high temperature polycarbonate injection molder. The hybrid optical disc may include a polycarbonate layer. When the master is pressed on the polycarbonate layer, the data is patterned on to the polycarbonate layer. The molded hybrid optical disc may also go through final processing, for example, metallization. In some embodiments, the molded hybrid optical disc may be transferred to a disc burning apparatus 106 directly from the molding apparatus 108 before any final processing. The disc burning apparatus 106 can be a part of the pressing apparatus 108 or can operate independently. The pressed hybrid optical discs 102 can be transferred automatically through a conveyer system to the disc burning apparatus 108. In an embodiment, the hybrid optical discs 102 can be loaded by a machine, human, or a combination of machine and human interface into the burning apparatus 106.

The disc burning apparatus 106 can include one or more lasers to inscribe data on to the hybrid optical discs. The disc burning apparatus 106 can select data from a varying content data source 150. In an embodiment, the disc burning apparatus 106 can burn the selected data onto the hybrid optical disc by selectively heating parts of an organic dye layer of the hybrid optical disc with a laser. The heating process can change the reflectivity of the dye, thereby creating marks that can be read like the pits and lands of pressed discs. In some embodiments, a polymer dye may be spin coated on top of a pressed hybrid optical disc after the pressing operation, but before the burning process. The laser can also burn data directly (without using polymer dye) on the polycarbonate layer of the hybrid optical disc received from the molding apparatus 108. The disc may be further processed after burning the varying data. For instance, one of the burning or pressing apparatuses can deposit a metal reflective layer through a sputtering process. The disc burning apparatus 106 can use one or more location identifiers on the hybrid optical disc to identify a portion of the disc for burning data.

The locations identifiers can be predefined on the hybrid optical discs when the blank hybrid optical discs are first manufactured. In another embodiment, a location inscriber 110 can dynamically add location identifiers on the hybrid optical discs to identify a position for inserting the varying data. For example, the location inscriber 124 can add session information on to the disc to indicate an end of first session as described with respect to FIG. 4. In some embodiments, the location inscriber 124 can insert coding information on the hybrid optical disc to identify position information for the varying data, described with respect to FIG. 3. The location inscriber 124 can be a separate apparatus or included as a component or module in one of the pressing apparatus 108 or the burning apparatus 106. In an embodiment, the location identifiers are patterned directly in the master along with the primary data. In this case, when the disc pressing apparatus 108 presses the master on the hybrid optical disc, the location identifiers can be included along with the primary data.

The hybrid optical discs 102 can include features enabling insertion of data via both the pressing and the burning process. As described above, the hybrid optical disc may be coated with a polycarbonate layer for storing data via the pressing process. Furthermore, the hybrid optical disc may also include a polymer dye layer for inserting data through the burning process. In an embodiment, the hybrid optical disc 102 includes both the polycarbonate and the organic dye materials.

IV. Example Fingerprinting Process

Figure 2:
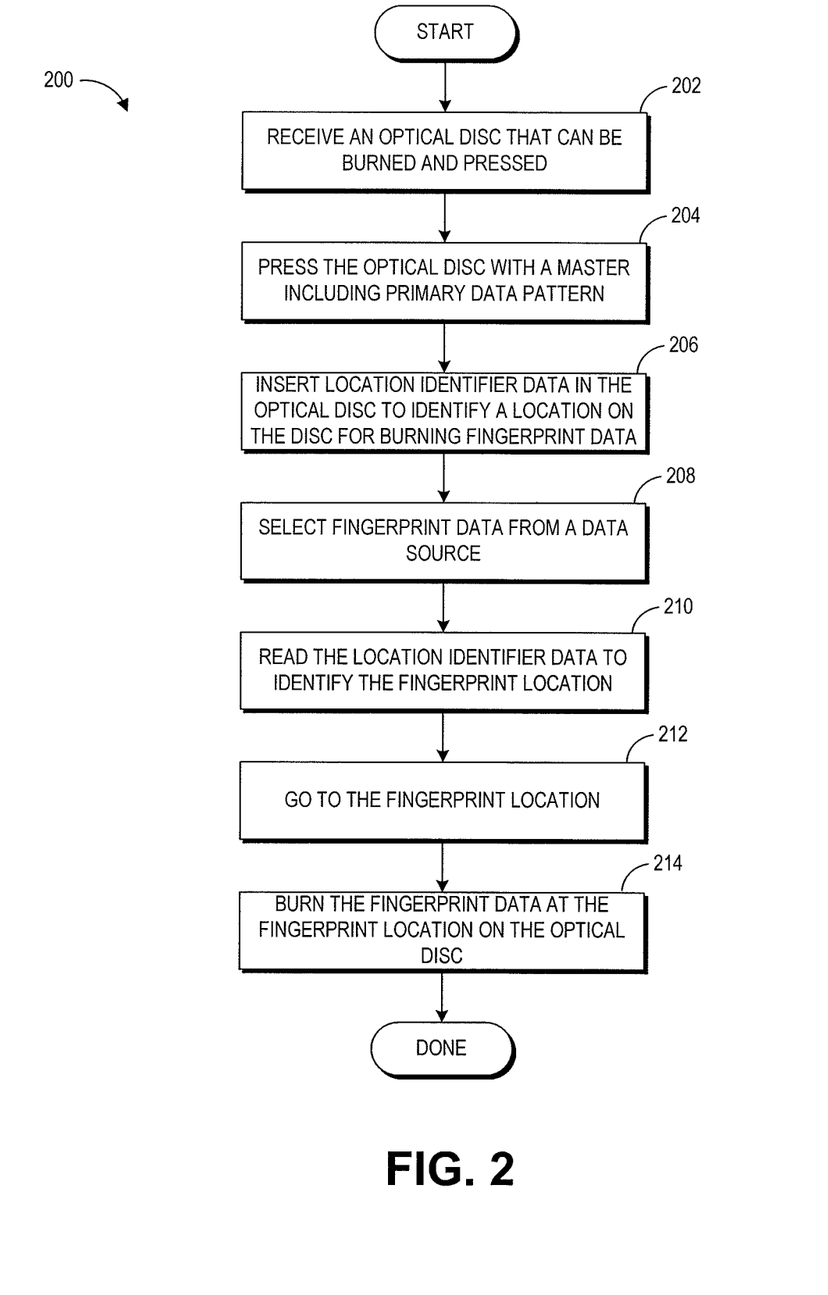
FIG. 2 illustrates an embodiment of a process for fingerprinting an optical disc.

FIG. 2 illustrates an embodiment of a process 200 for fabricating a hybrid optical disc with a fingerprint. The process can be implemented by one or more apparatuses described above with respect of FIG. 1. At block 202, the pressing apparatus 108 can receive a hybrid optical disc 102 for including primary data. The hybrid optical disc 102 can include materials that can enable writing data through both the pressing and burning processes. The pressing apparatus 108 can include an injection molding unit for pressing a master onto the hybrid optical disc 102. The master can include patterns associated with the primary data pattern. At block 204, the pressing apparatus 108 can press the master disc on to the hybrid optical disc 102 resulting in engraving of the pattern from the master into the polycarbonate layer of the hybrid optical disc 102. After the pressing block 202, the hybrid optical disc 102 can include the same pattern from the master corresponding to the primary data. In some embodiments, the pressing apparatus 108 can stamp more than 500 discs in an hour.

At block 206, the location inscriber apparatus 124 can insert location identifiers on the hybrid optical disc 102. The location identifiers can indicate the position in the hybrid optical disc 102 for inserting the varying data (e.g., fingerprint data) using the burning process. The location identifiers can include coding data for identifying the burn data positions. In an embodiment, the coding data includes the barcodes used in the LightScribe™ labeling process. Other types of coding data can also be used to identify a position on the hybrid optical disc for burning varying data. For example, the primary data can be encoded using the ISO-9660 (ECMA-119) file system standard. The ISO-9660 standard can indicate unused portions in the optical disc that can identify the burn data positions. Thus, in an embodiment, coding data can include formatting the primary data according to the ISO-9660 standard in the master. The coding data can be inserted as part of the pressing process by including the location information in the master. In another embodiment, the burning apparatus can encode coding information using one or more of its lasers. The coding data can also be predefined when the blank hybrid optical discs are first manufactured.

In some embodiments, the location identifiers can include session information for identifying the burn positions. The end of session markers can identify the location on the hybrid optical disc for inserting varying data. The master can include end of session information, which can be transferred to the hybrid optical disc during the molding process. In some embodiments, the burning apparatus can encode session information using one or more of its lasers.

As described above, including digital fingerprint data in a hybrid optical disc can protect the hybrid optical disc from piracy and counterfeiting. At block 208, the burning apparatus can select fingerprint data from the varying data source 150 to include in the hybrid optical disc. The digital fingerprint data can include encryption data. The digital fingerprint data can also include serial number or license key or other similar Digital Rights Management (DRM) data. The fingerprint data can vary between plurality of discs while the maintaining the same primary data. The varying data may also include digital watermark data. In an embodiment, the hybrid optical disc can be authenticated using the varying data. For example, the varying data may include identification information for tracking where and how many times the hybrid optical disc is played. If someone attempts to copy the hybrid optical disc, the copied version will include the same varying data as the original. A tracking system can block playback of the copied disc based on, for example, location identification. Other types of authentication systems can also be used depending on the type of varying data included in the hybrid optical disc. After selection of the varying data, at block 210, the burning apparatus can read the location identifier on the hybrid optical disc to identify the position on the hybrid optical disc for burning the varying data. At block 212, one or more lasers and the optics of the burning apparatus can align with the identified burn location on the hybrid optical disc for inserting the fingerprint data. At block 214, the burning apparatus can activate one or more lasers to heat portions in the hybrid optical disc at the identified location to correspond to the fingerprint data. In some embodiments, further finishing processes, for example, metallization can be used to complete the fabrication process.

At block 216, if there is a second disc available for fabrication, the process can restart at block 202 and continue with the same primary data, but a different fingerprint data for the second disc. Accordingly, plurality of hybrid optical discs can be fabricated including the same primary data, along with different varying fingerprint data for each of the discs.

In some embodiments, the process 200 can be performed in a single apparatus. For example, the pressing apparatus can include both the burning and the location inscriber apparatuses. In some embodiments, the fabrication system includes plurality of burning apparatuses 106 for one molding apparatus 108. The molding apparatus 108 can be a high throughput machine because pressing is generally faster than burning. Therefore, the pressed hybrid optical discs may be sent to multiple burning apparatuses for including varying data to increase production line efficiency.

V. Example Coded Hybrid Optical Disc

Figure 3:
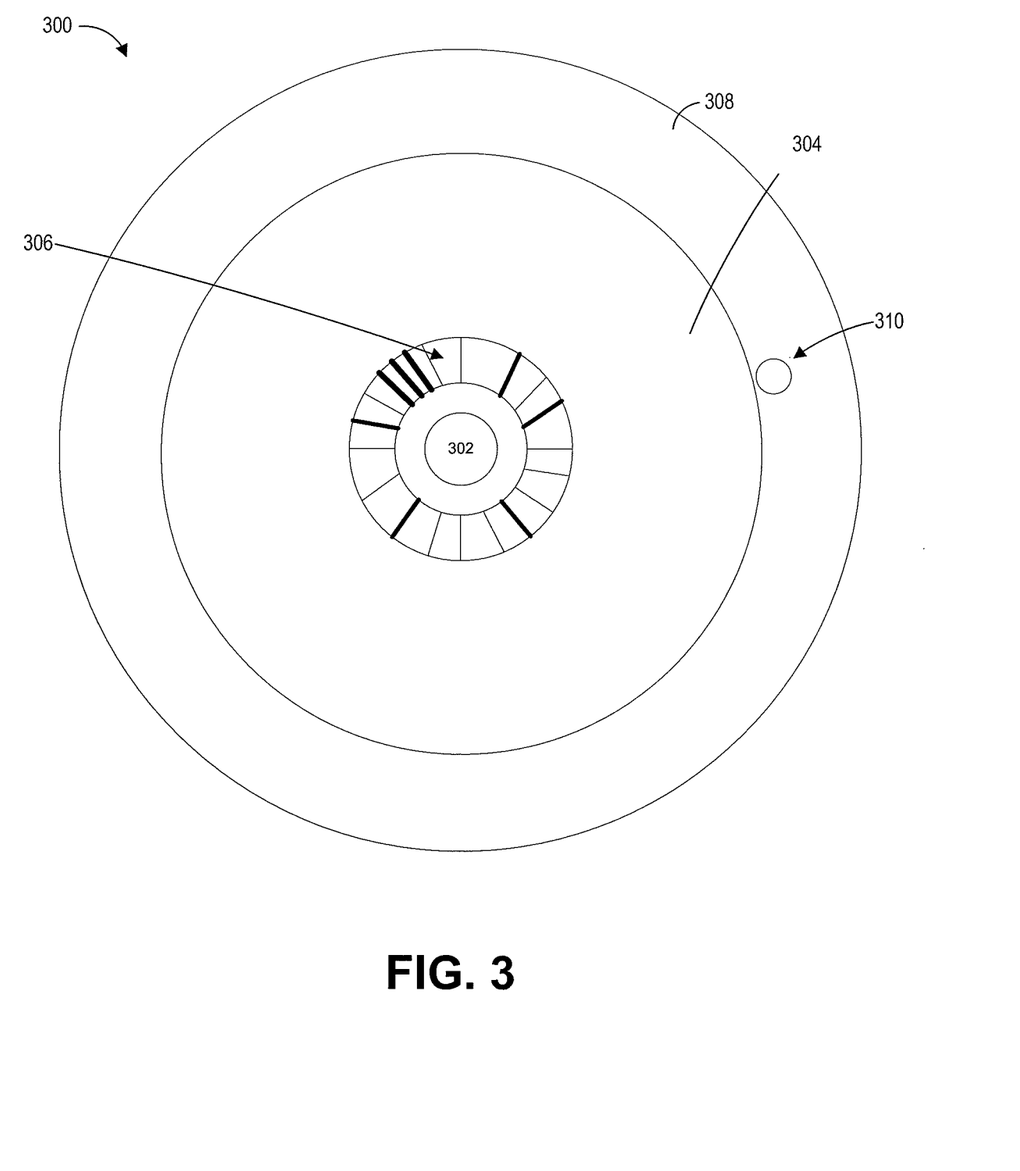
FIG. 3 illustrates an example optical disc fingerprinted according to the coding scheme.

FIG. 3 illustrates an example embodiment of a hybrid optical disc 300, including coding location identifiers, fabricated with one of the methods described above. The hybrid optical disc 300 can, for example, be a hybrid CD, DVD, or high definition optical disc. Any of the current disc readers can read the hybrid optical discs 300 prepared using the methods described herein.

The hybrid optical disc 300 includes a first portion 304 for storing primary data via the molding process. The first portion may occupy a majority of the space in the hybrid optical disc 300 as shown in FIG. 3. The primary data can be molded on to the hybrid optical disc 300 in the first portion 304 using the molding apparatus 108. The primary data can include, for example, data corresponding to movies, software, games, music, or technical documents. After (or before in some embodiments) the primary data is pressed, there might be a portion 308 available in the hybrid optical disc 300 for including additional data. In an embodiment, the additional data can include varying data, for example, digital fingerprints, to improve piracy protection. The data can be considered varying as it may change between discs containing the same primary data. The portion 308 may also be located within the first portion 304.

Varying data can be included on the hybrid optical disc using the burning apparatus 106. One or more lasers of the burning apparatus can burn patterns corresponding to the varying data on to the hybrid optical disc 300. The burning apparatus 106 may need to identify the location on the hybrid optical disc 300 for adding the varying data. The location information can be included in the location identifier portion 306 of the hybrid optical disc 300. The location identifier portion 306 can include coding for identifying a position on the hybrid optical disc 300 for burning varying data.

The location identifier portion 306 can include a barcode for identifying a burn location 310 in the unused disc portion 308 for burning the varying data. The barcode can include a pattern that can correspond to the burn location 310. In an embodiment, the location identifier portion 306 can use coding scheme used in the LightScribe™ optical disc labeling process for encoding the burn location 310. Some or all of the coding information 306 may be prefabricated on the hybrid optical disc 300. For example, the space required for a particular type of data (e.g., movies), in the hybrid optical disc may be known. Accordingly, the burn location can also be predefined and the barcode can be inserted before the pressing and/or burning process.

The location identifier portion 306 can also be dynamically added during the fabrication process depending on the primary data. For example, the burn location 310 can depend on the size of the primary data and/or the varying data. The burn location 310 may also depend on the type of the primary data and/or the varying data. The location inscriber apparatus 124 can include one or more processors for calculating the burn location 310 based on the size of the hybrid optical disc 300 and the size of the primary data.

The location inscriber apparatus 124 can inscribe coding information corresponding to the burn location on the hybrid optical disc 300 using the burning process.

VI. Example Multi-Session Disc

Figure 4:
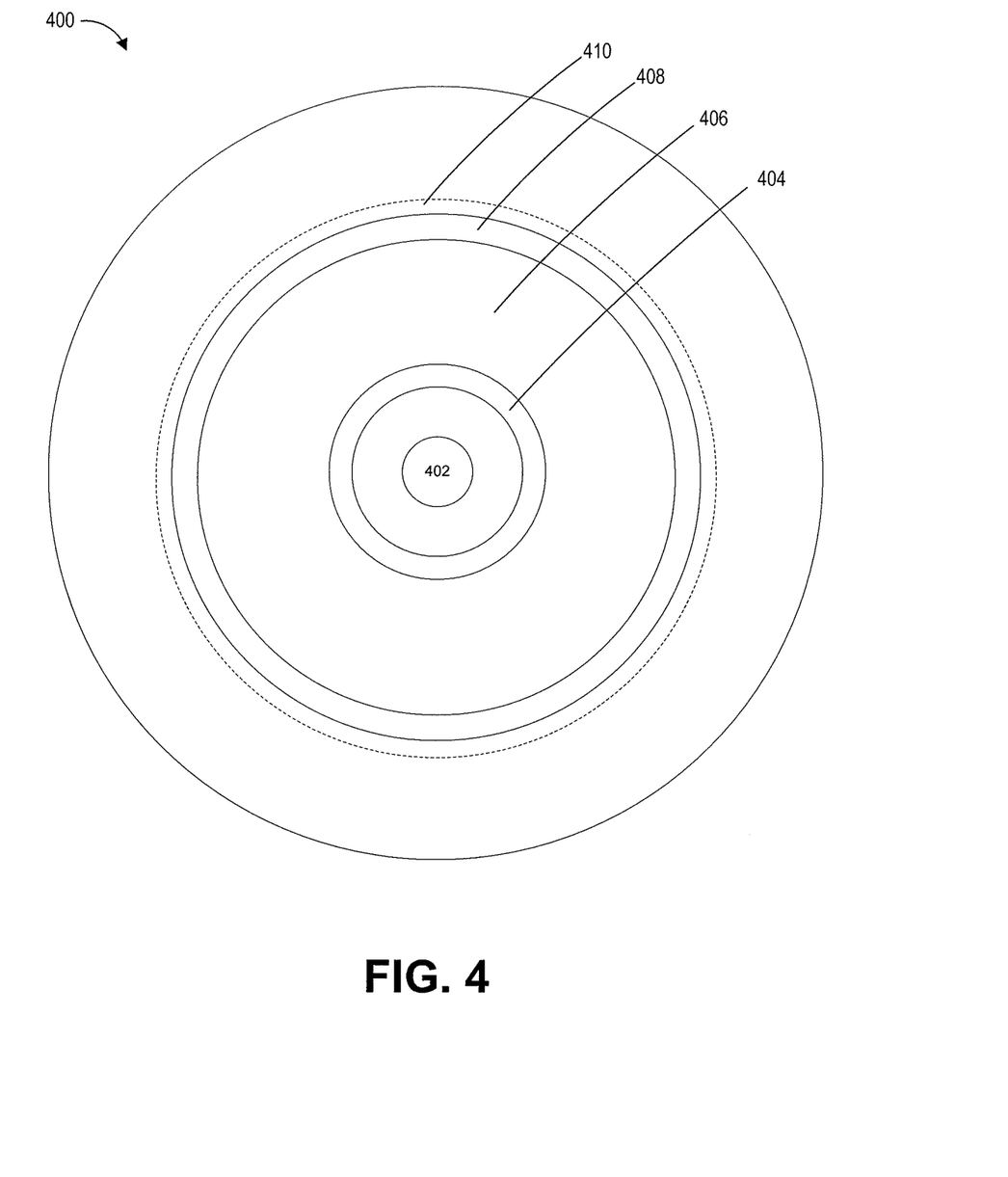
FIG. 4 illustrates an example optical disc fingerprinted according to the session scheme.

FIG. 4 illustrates an example hybrid optical disc 400, including the session location identifier, fabricated according to the methods described herein. Optical discs can be authored in multiple sessions. Each session may correspond to a data write operation. The session information can be used to identify a burn location 410 for including varying data in the hybrid optical disc.

A session can include a lead-in portion 404, a session data portion 406, and a lead out portion 410. The lead-in portion 404 can indicate a starting point for each session. The lead-in portion 404 can include position information of the data portion 406. The lead-out portion 408 can indicate the end (or closing) of the session. In an embodiment, the session information is stored in the master and included during the molding process of primary data. The burning apparatus 106 can use the session information on the hybrid optical disc 400 to identify the burn location 410. The burning apparatus 106 can include a reader for identifying the lead-out portion 408. After finding the end of session 408, the burning apparatus can write a second session on the hybrid optical disc starting at burning portion 410. The burning apparatus, using one of its lasers, can encode a second lead-in portion corresponding to the second session. Subsequently, the burning apparatus 106 can burn the varying data and the lead-out portion to close the second session. The second lead-in portion may include position information for varying data. Accordingly, the hybrid optical disc 400 can include a first session corresponding to the primary data created using the molding process and a second session corresponding to the varying data created using the burning process.

VII. Example Hybrid Optical Disc

Figure 5:
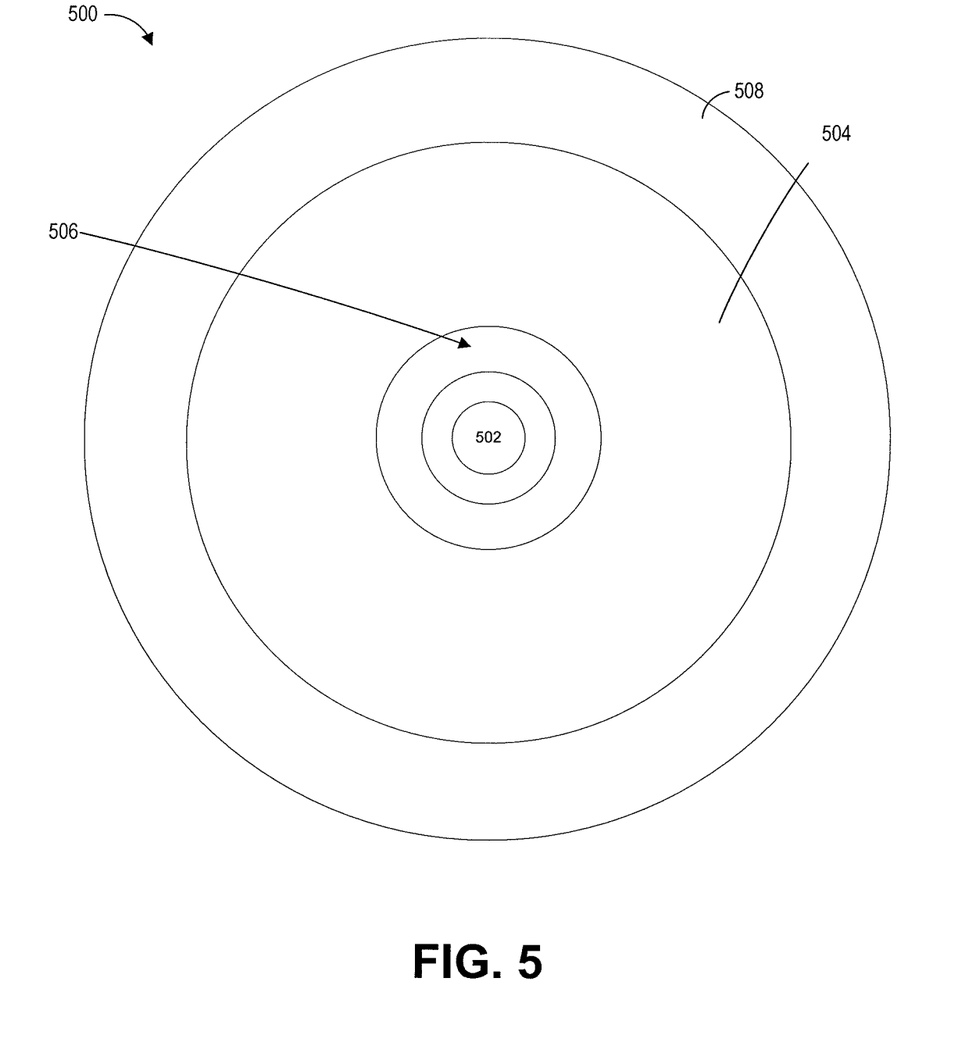
FIG. 5 illustrates an example hybrid optical disc in accordance with embodiments of the disclosure.

FIG. 5 illustrates an example embodiment of a blank hybrid optical disc 500. As described above, hybrid optical discs enable identical content to be rapidly encoded onto a large number of discs via pressing, while allowing these discs to be varied in content via disc burning process. The hybrid optical disc 500 includes a first portion 504 that is configured to be encoded via a disc pressing process, and a second portion 508 that is configured to be written to by a disc burning process. In an embodiment, the first portion 504 and the second portion 508 are fabricated separately. The first portion may include the inner circumferential portion of the hybrid optical disc as shown in FIG. 5. The second portion 508 can be outer circumferential portion of the hybrid optical disc 500. In some embodiments of the hybrid optical discs, the first portion 504 is the outer circumferential portion while the second portion 508 is in the inner circumferential portion. The second portion 508 can also be located as an island or a ring within the first portion 504. In an embodiment, the first portion 504 along with location information portion 506, and the center hole 502 can be fabricated as one component and the second portion 508 can be fabricated as another component. The two components can then be fused, molded, or snapped together to combine the first and second portions into a single hybrid optical disc 500. In another embodiment, the first and the second portion may partially overlap. For example, the second portion 508 may include an organic polymeric material that can be spin-coated on top the hybrid optical disc 500. Other methods of depositions can also be used, for example, sputtering, chemical vapor deposition, etc.

The first portion 504 may be composed of material that enables encoding of data via disc pressing process. For example, the first portion 504 can include a polycarbonate (e.g., Bisphenol-A polycarbonate) layer for pressing. The second portion 508 can include a material that can change physical characteristics when irradiated with optical radiation. For example, the second portion 508 can include an organic dye layer or an alloy composed of a phase change material, such as silver-indium-antimony-tellurium (AgInSbTe).

The position, structure, and composition of the location information portion 506 can depend on the type of location identification scheme used. For the coding scheme, the coding information may be pre-fabricated on the blank hybrid optical disc. In an embodiment, the location information portion 506 includes the same material as the first portion 506 to enable encoding coding data via the pressing process. The location information portion 506 can also include the same material as the second portion 508 to enable writing coding data via the burning process.

VIII. Additional Embodiments

It should be noted that in addition to fingerprinting fabrication process, any of the methods described herein can also be implemented in including other types of varying data. The hybrid fabrication process can be used to include serial numbers on the optical disc or varying geographical information.

IX. Terminology

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multithreaded processing, interrupt processing, or multiple processors or processor cores or on other parallel architectures, rather than sequentially. In addition, different tasks or processes can be performed by different machines and/or computing systems that can function together.

All of the methods and tasks described above may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a hardware processor (or multiple hardware processors) that includes digital logic circuitry for executing program instructions or modules stored in a memory or other computer-readable storage medium. The various functions disclosed herein may be embodied in such program instructions, although some or all of the disclosed functions may alternatively be implemented in application-specific digital logic circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A method comprising:
    encoding identical data on a first portion of each of a plurality of optical discs using a disc pressing process in which a master disc is used to define a pressing pattern; and
    encoding variable data on a second portion of each of the plurality of optical discs using a disc burning process in which at least one laser is used to modify a reflective property of optical disc material, such that at least some of the plurality of optical discs vary in content,
    wherein encoding the identical data on the first portion of each of a plurality of optical discs comprises encoding a location identifier defining a location of the second portion of each of the plurality of optical discs.

2. The method of claim 1, wherein the identical data comprises video content of a movie.

3. The method of claim 1, wherein the variable data comprises digital fingerprint data, such that at least some of the plurality of optical discs have different digital fingerprints than others of the plurality of optical discs.

4. The method of claim 1, wherein the variable data comprises variable logo data, such that at least some of the plurality of optical discs have different logos than others of the plurality of optical discs.

5. The method of claim 1, wherein the variable data comprises variable advertisement content, such that at least some of the plurality of optical discs have different advertisement content than others of the plurality of optical discs.

6. A method comprising:
    receiving an optical disc configured to store data via pressing and burning processes;
    pressing the optical disc with a master including a pattern associated with primary data;
    inserting a location identifier before burning varying data on the optical disc to identify a burn storage portion in the optical disc for including varying data by the burning process; and
    burning the varying data on to the burn storage portion of the optical disc using the burning process.

7. The method of claim 6, wherein burning the varying data comprises reading the location identifier to identify the burn storage portion.

8. The method of claim 6, wherein the burning the varying data comprises using at least one laser to modify a physical property of optical disc material.

9. The method of claim 6, wherein the location identifier comprises at least one of a unique code representing a location on the disc for including the varying data, or a lead-out portion configured to indicate an end of session.

10. The method of claim 6, wherein the varying data comprises digital fingerprint data configured to enhance privacy protection of the primary data on the optical disc.

11. The method of claim 6, wherein the varying data comprises variable logo data.

12. An optical disc comprising:
    a first portion configured to be encoded with first data by a disc pressing process, the first portion comprising a polycarbonate material;
    a second portion configured to be encoded with second data via a burning process, the second portion comprising a burn material, said burn material configured to change reflectivity when exposed to optical radiation; and
    a location identifier portion configured to indicate a location for storing the second data via the burning process in the second portion on the optical disc.

13. The optical disc of claim 12, wherein the first portion is mechanically attached with the second portion.

14. The optical disc of claim 12, wherein the polycarbonate material comprises Bisphenol-A polycarbonate.

15. The optical disc of claim 12, wherein the burn material comprises an organic dye.

16. The optical disc of claim 12, wherein the burn material comprises an alloy.

17. An apparatus comprising:
    a pressing system configured to encode primary data and a location identifier with the primary data on a first portion of each of a plurality of optical discs, said location identifier identifying a burn location on each of the plurality of optical discs;
    a controller configured to select varying data from a data source for each of the plurality of optical discs; and
    a disc burner configured to write the selected varying data on a second portion of each of the plurality of optical discs at the respective burn locations.

18. The apparatus of claim 17, wherein the primary data comprises video content of a movie.

19. The apparatus of claim 17, wherein the varying data comprises digital fingerprint data, such that at least some of the plurality of optical discs have different digital fingerprints than others of the plurality of optical discs.

20. The apparatus of claim 17, wherein the location identifier comprises at least one of a unique code or end of session information.

21. A method comprising:
    accessing an optical disc configured to store data via pressing and burning processes;
    initiating the pressing of the optical disc with a master including a pattern associated with primary data;

initiating an insertion of a location identifier on the optical disc during said pressing of the optical disc with the master to identify a burn storage portion in the optical disc for including varying data by the burning process; and initiating the burning of the varying data on to the burn storage portion of the optical disc using the burning process.

22. The method of claim 21, wherein burning the varying data comprises reading the location identifier to identify the burn storage portion.

23. The method of claim 21, wherein the location identifier comprises at least one of a unique code representing a location on the disc for including the varying data, or a lead-out portion configured to indicate an end of session.

24. The method of claim 22, wherein the varying data comprises digital fingerprint data configured to enhance privacy protection of the primary data on the optical disc.

* * * * *